Jan. 6, 1942.    R. G. ALLEN    2,269,391
MACHINE FOR MOLDING GLASS ARTICLES
Filed April 7, 1939    18 Sheets-Sheet 2
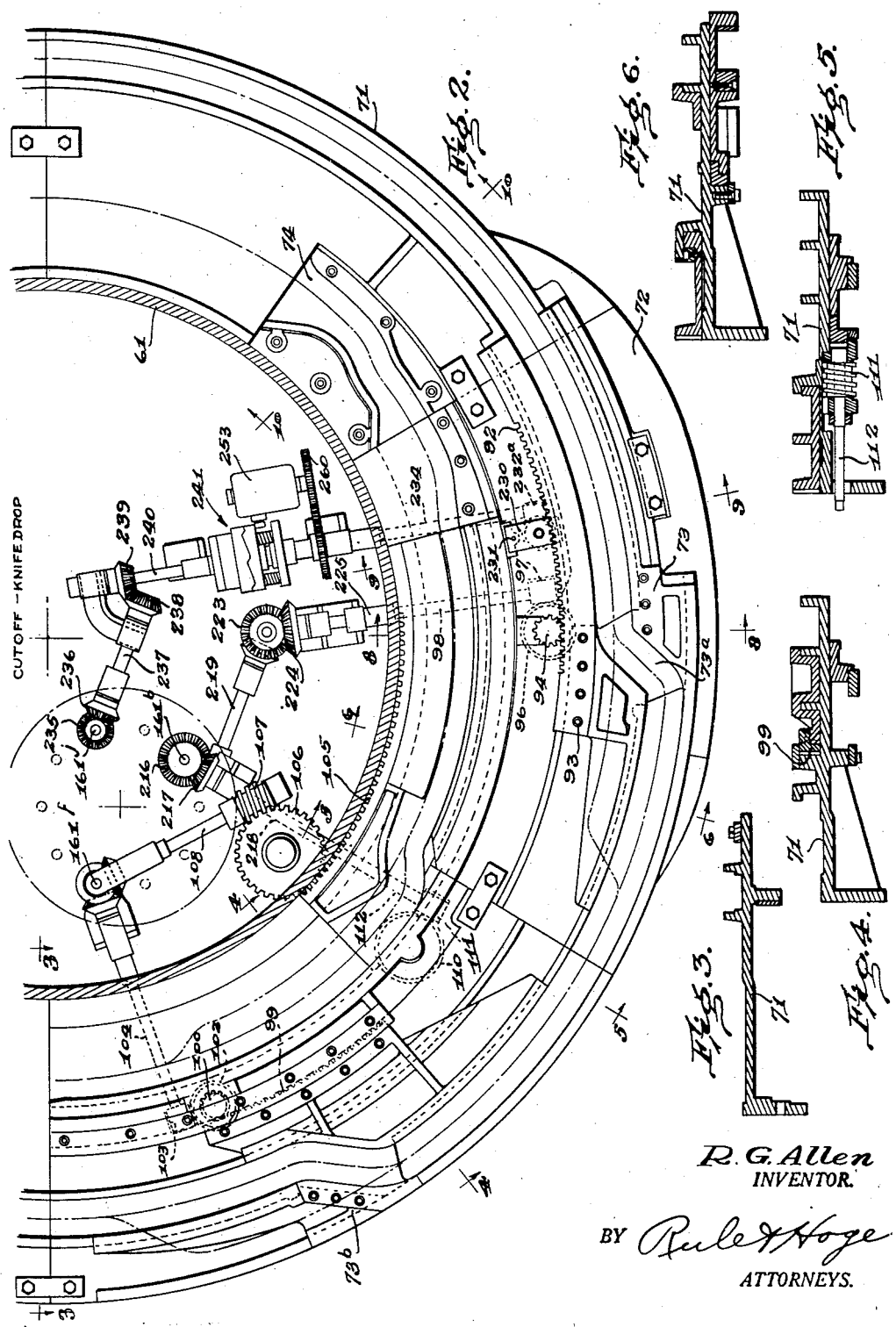
R. G. Allen
INVENTOR.
BY Rule & Hoge
ATTORNEYS.

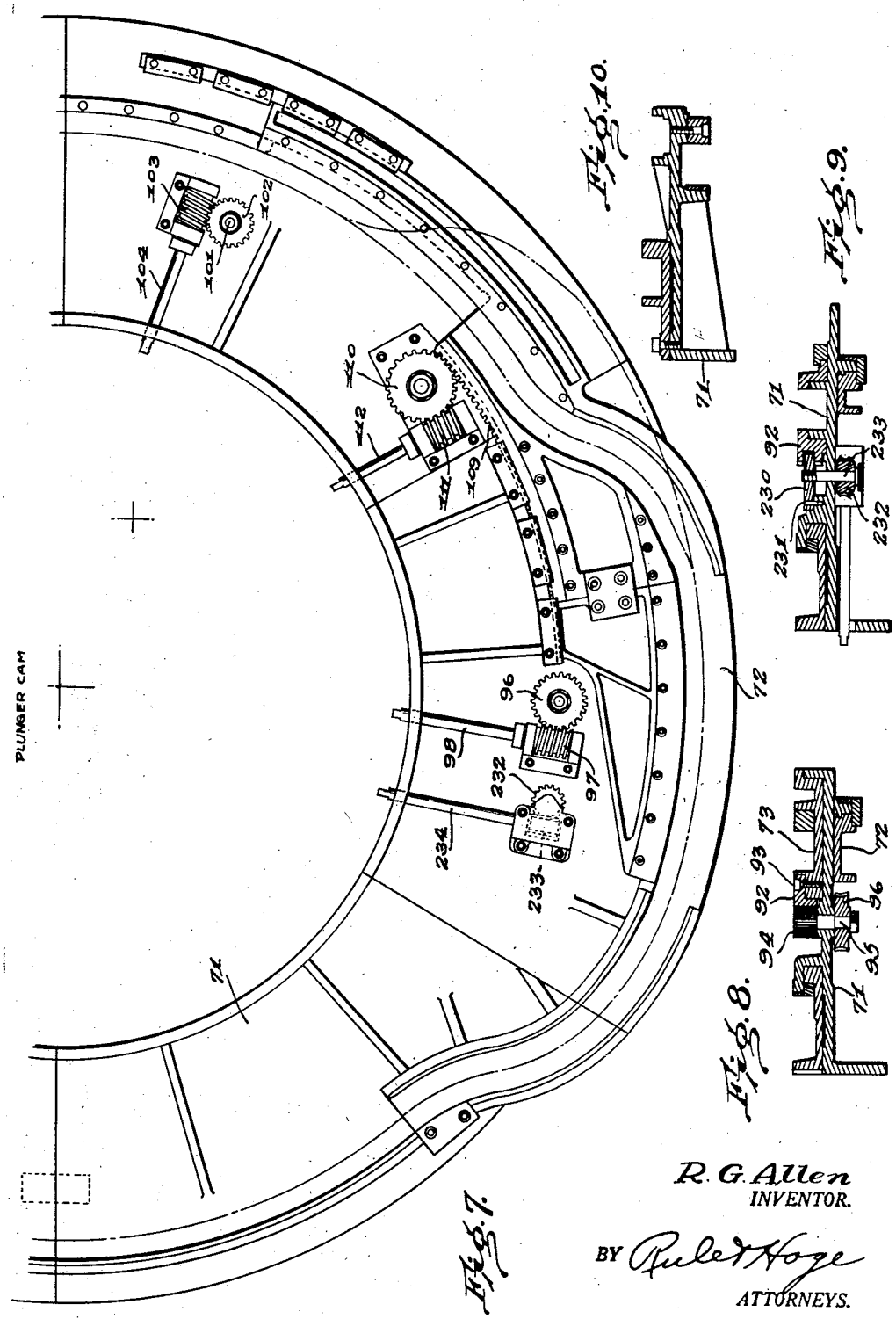

Jan. 6, 1942.  R. G. ALLEN  2,269,391
MACHINE FOR MOLDING GLASS ARTICLES
Filed April 7, 1939   18 Sheets-Sheet 4
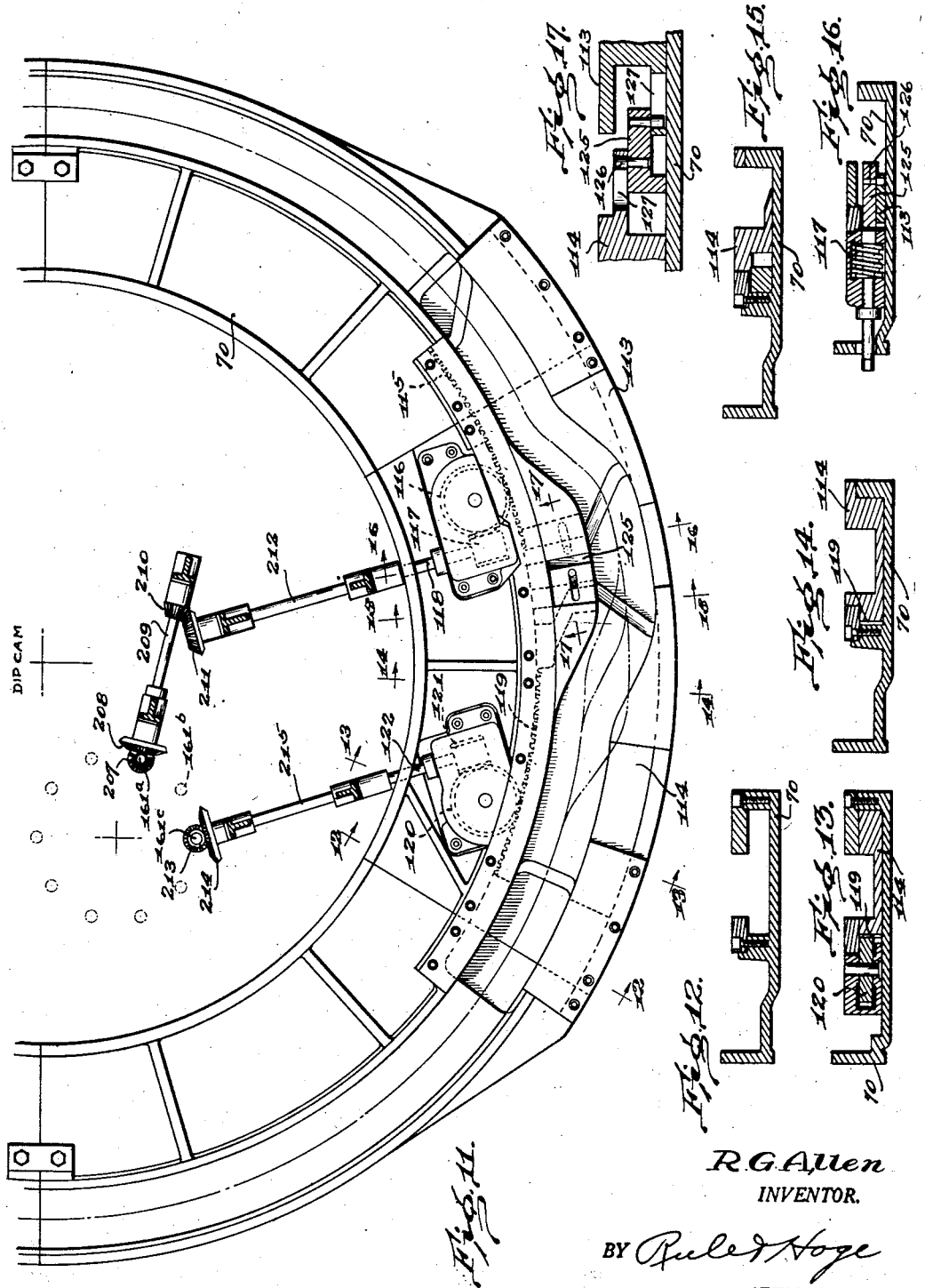
R.G.Allen
INVENTOR.
BY Rule & Hoge
ATTORNEYS.

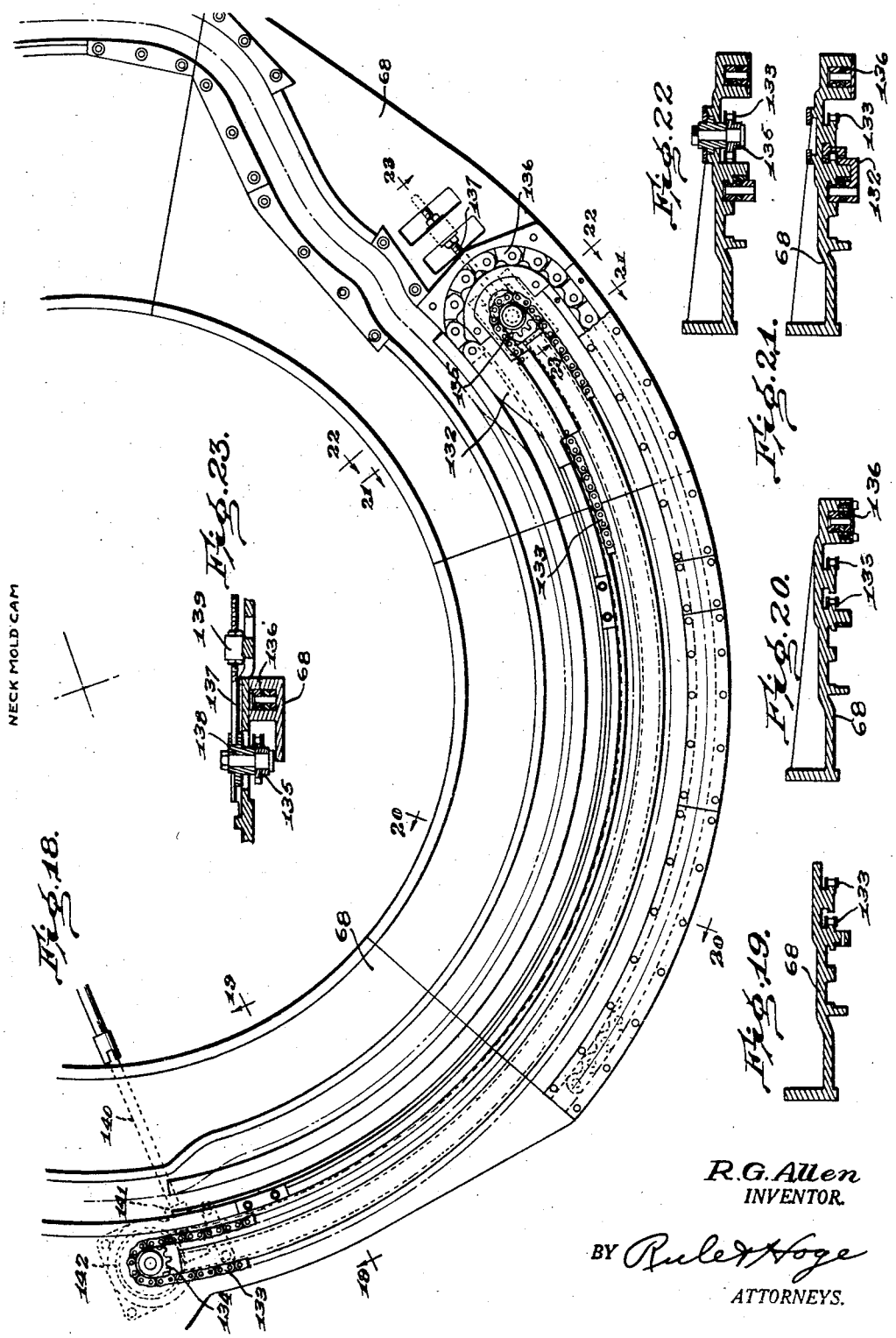

Jan. 6, 1942.   R. G. ALLEN   2,269,391
MACHINE FOR MOLDING GLASS ARTICLES
Filed April 7, 1939   18 Sheets-Sheet 6
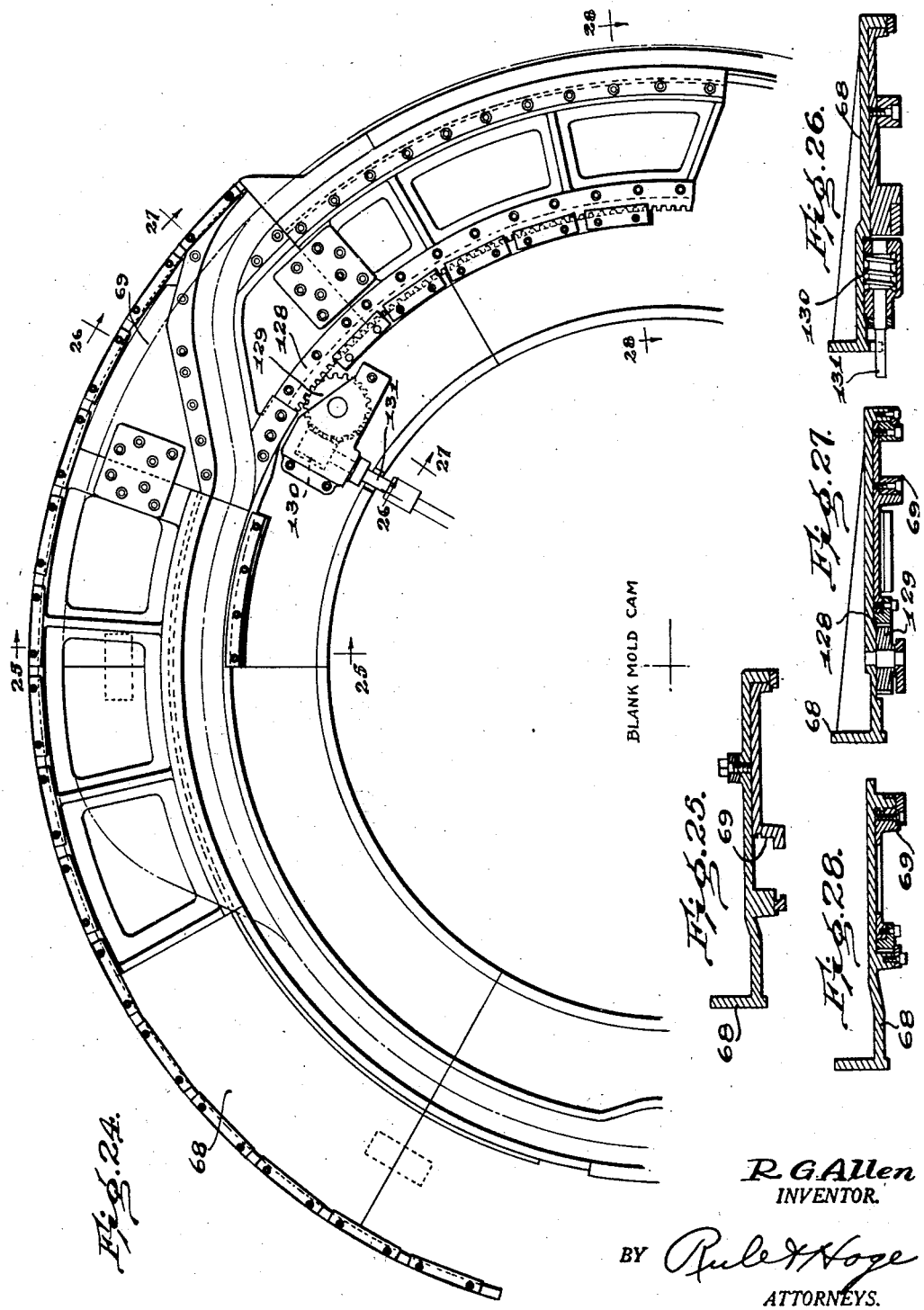
R. G. Allen
INVENTOR.
BY Rule & Hoge
ATTORNEYS.

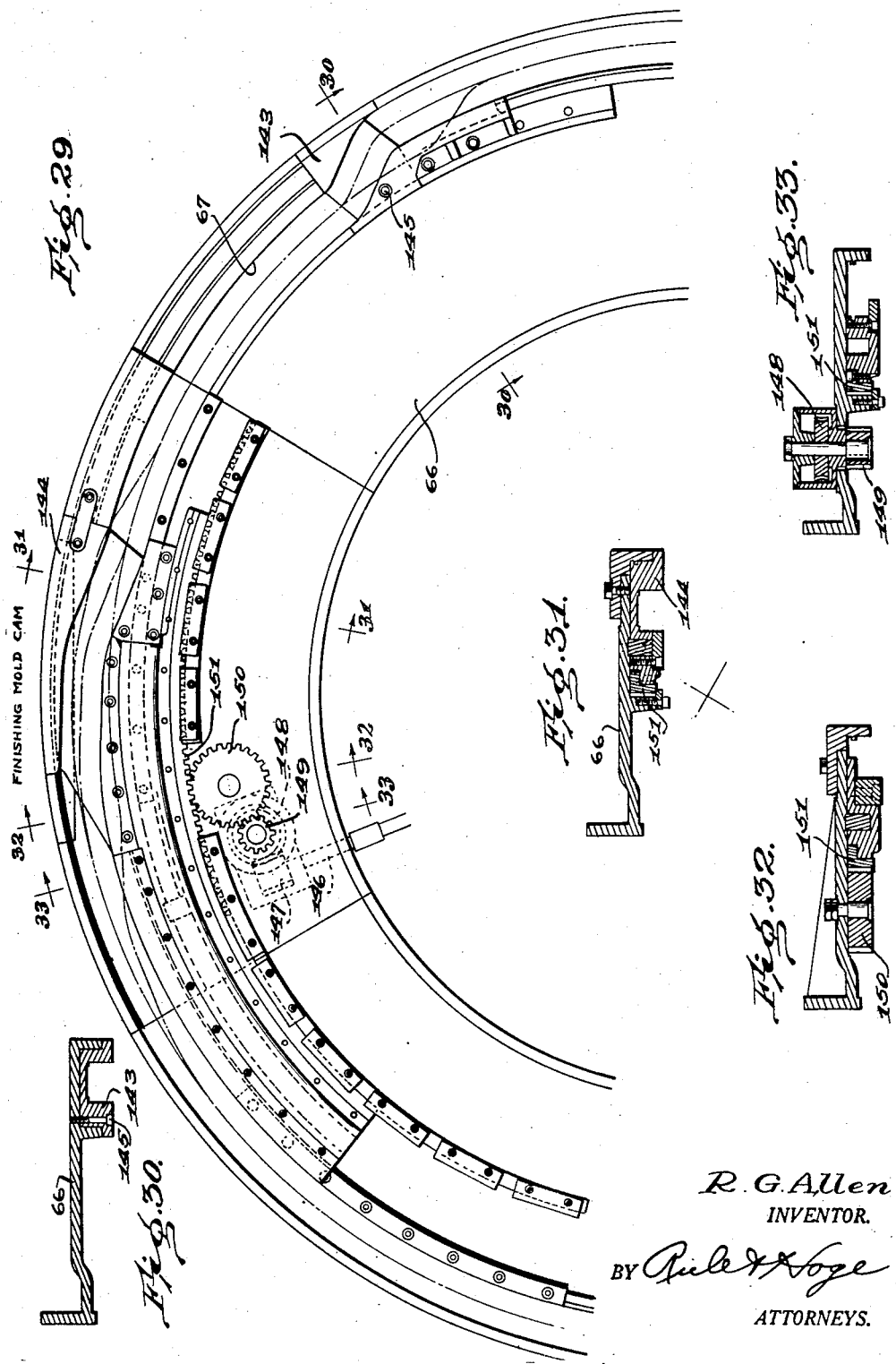

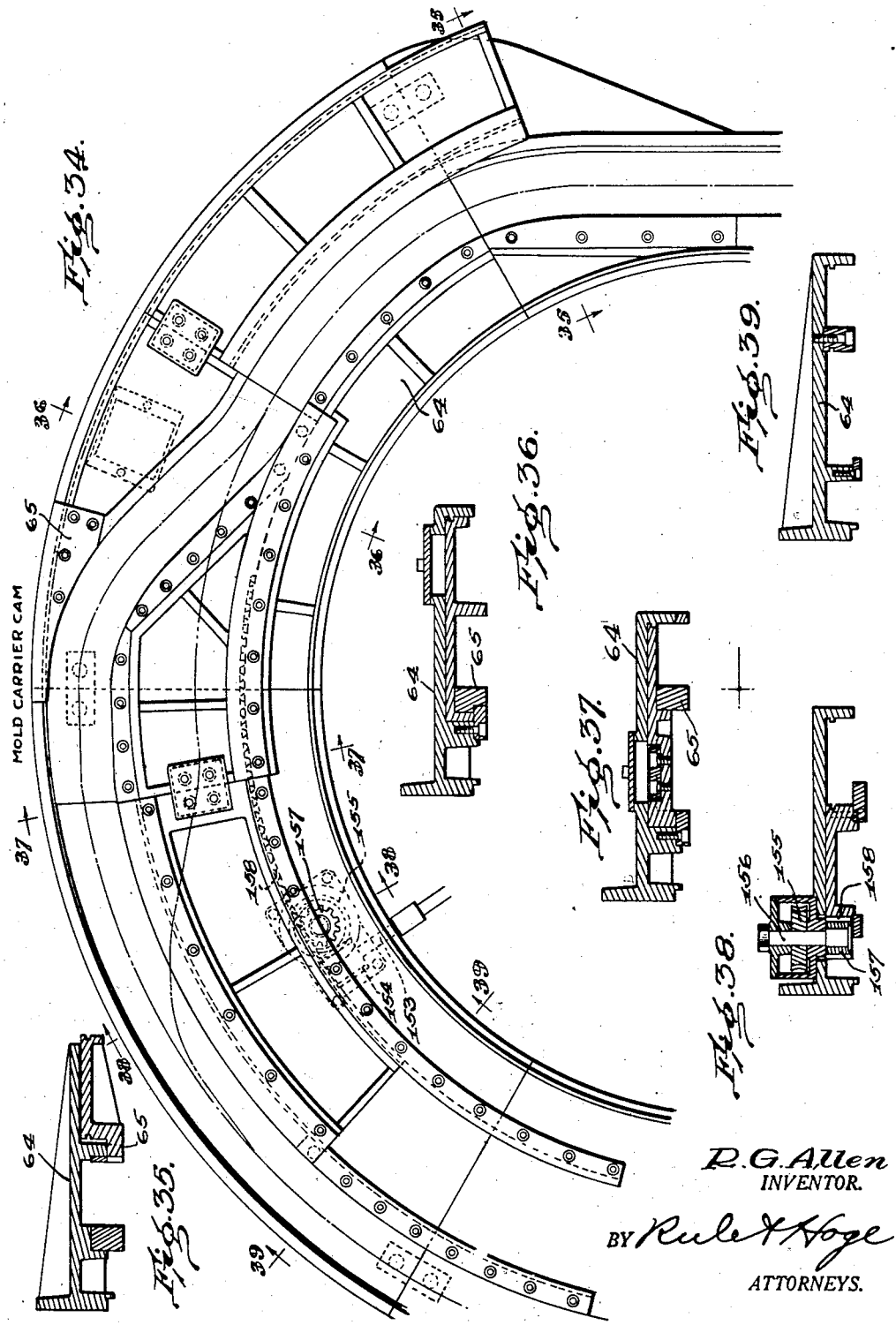

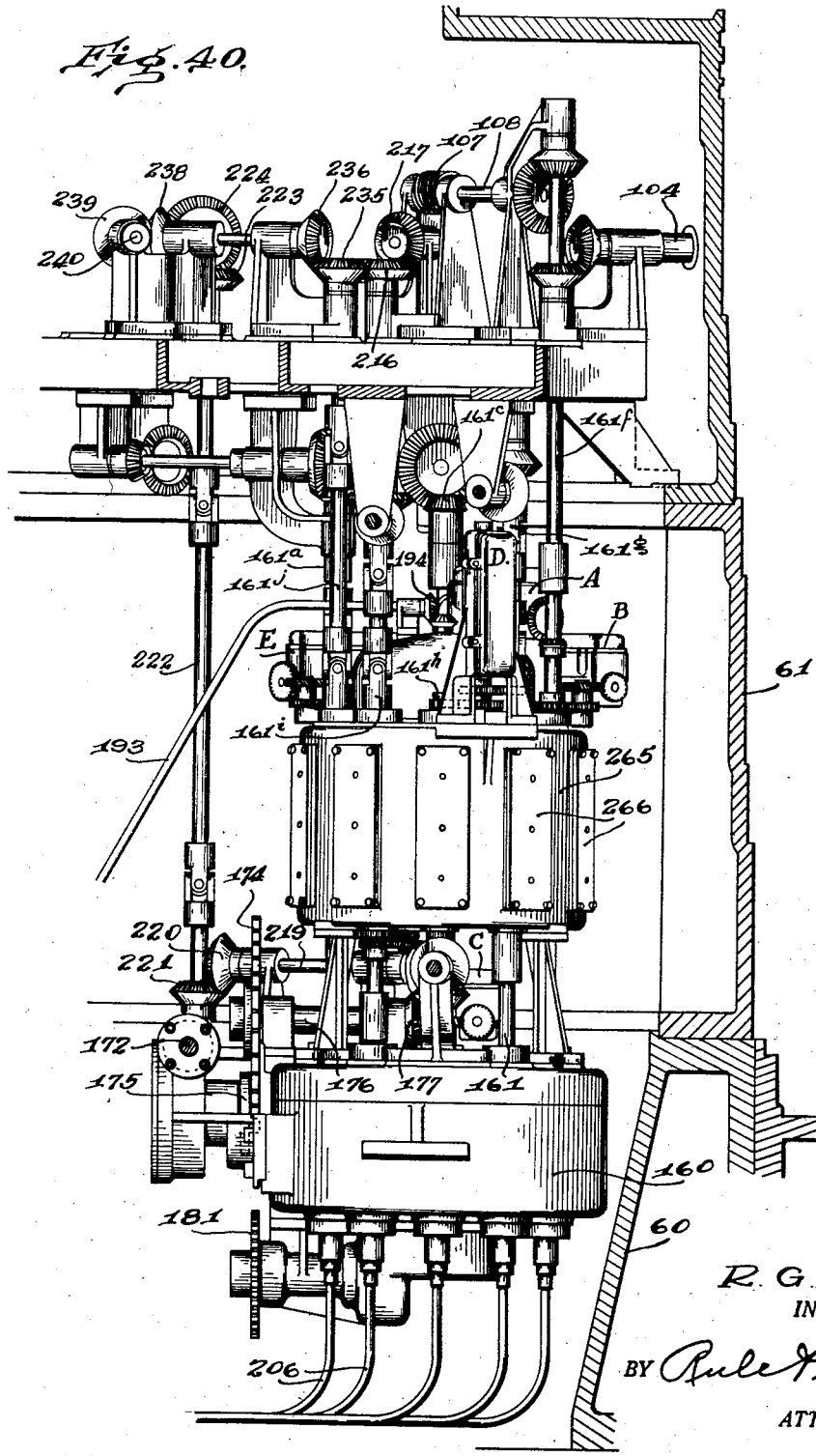

Jan. 6, 1942.   R. G. ALLEN   2,269,391
MACHINE FOR MOLDING GLASS ARTICLES
Filed April 7, 1939   18 Sheets-Sheet 10

R. G. Allen
INVENTOR.

BY *Rule & Hoge*
ATTORNEYS.

Jan. 6, 1942.                R. G. ALLEN                2,269,391
                    MACHINE FOR MOLDING GLASS ARTICLES
                    Filed April 7, 1939        18 Sheets-Sheet 11

R. G. Allen
INVENTOR.
BY Rule & Hoge
ATTORNEYS.

Jan. 6, 1942.  R. G. ALLEN  2,269,391
MACHINE FOR MOLDING GLASS ARTICLES
Filed April 7, 1939  18 Sheets-Sheet 12
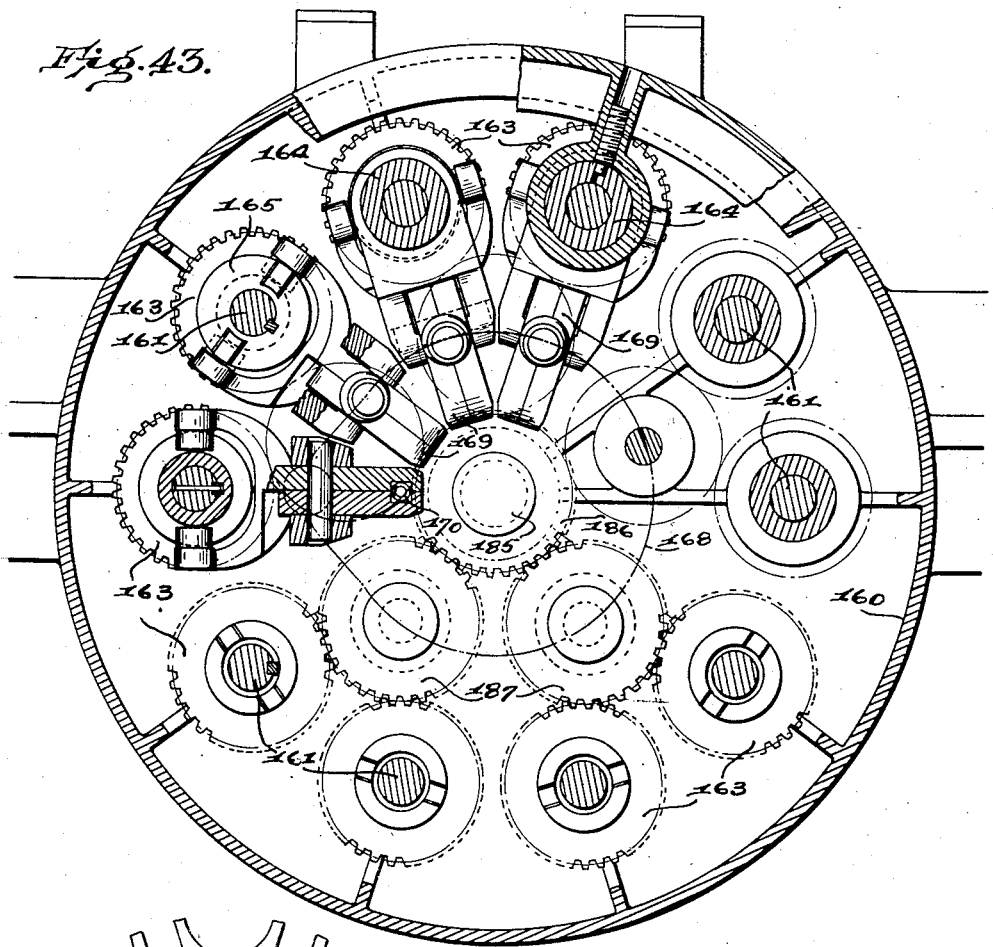

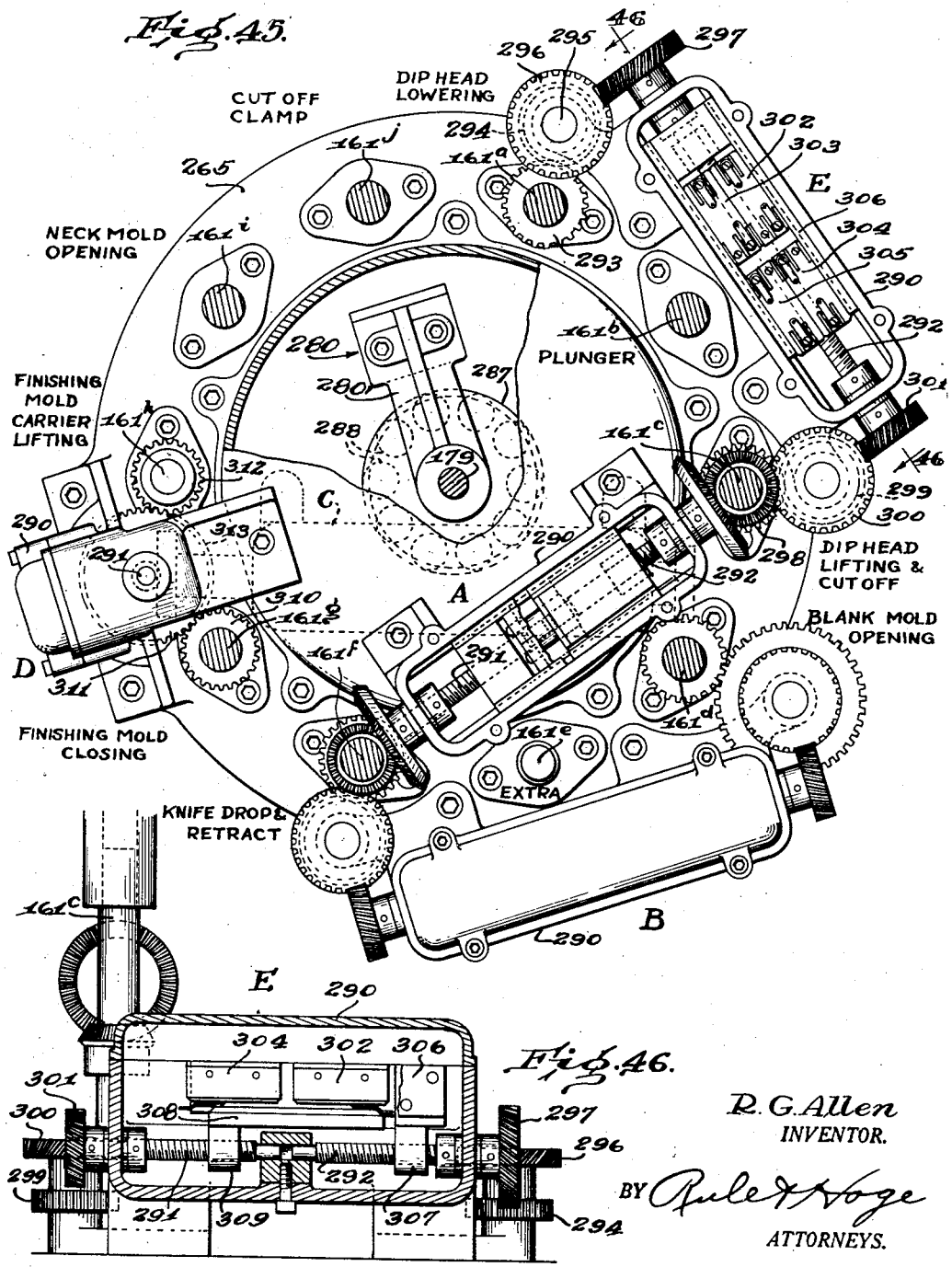

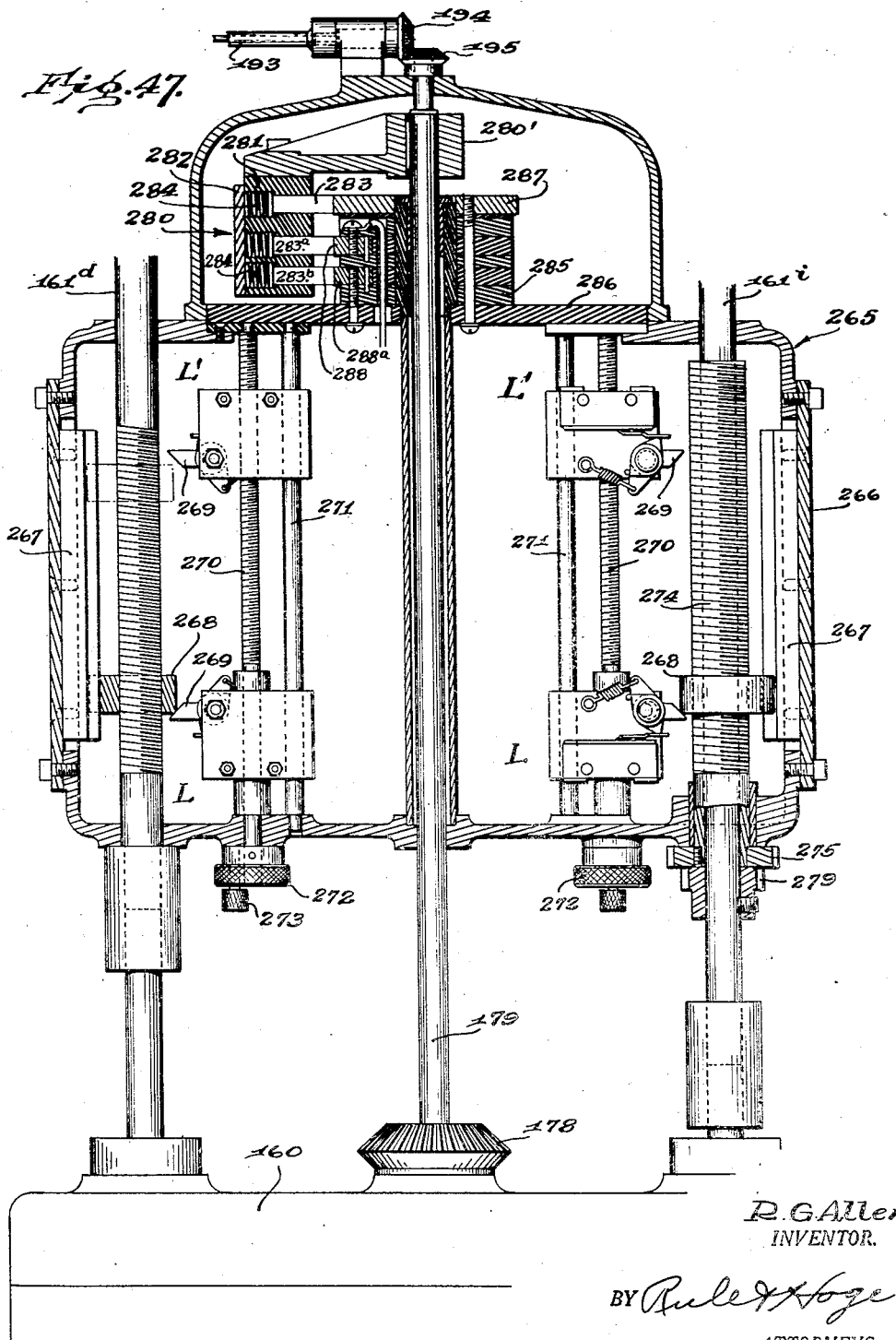

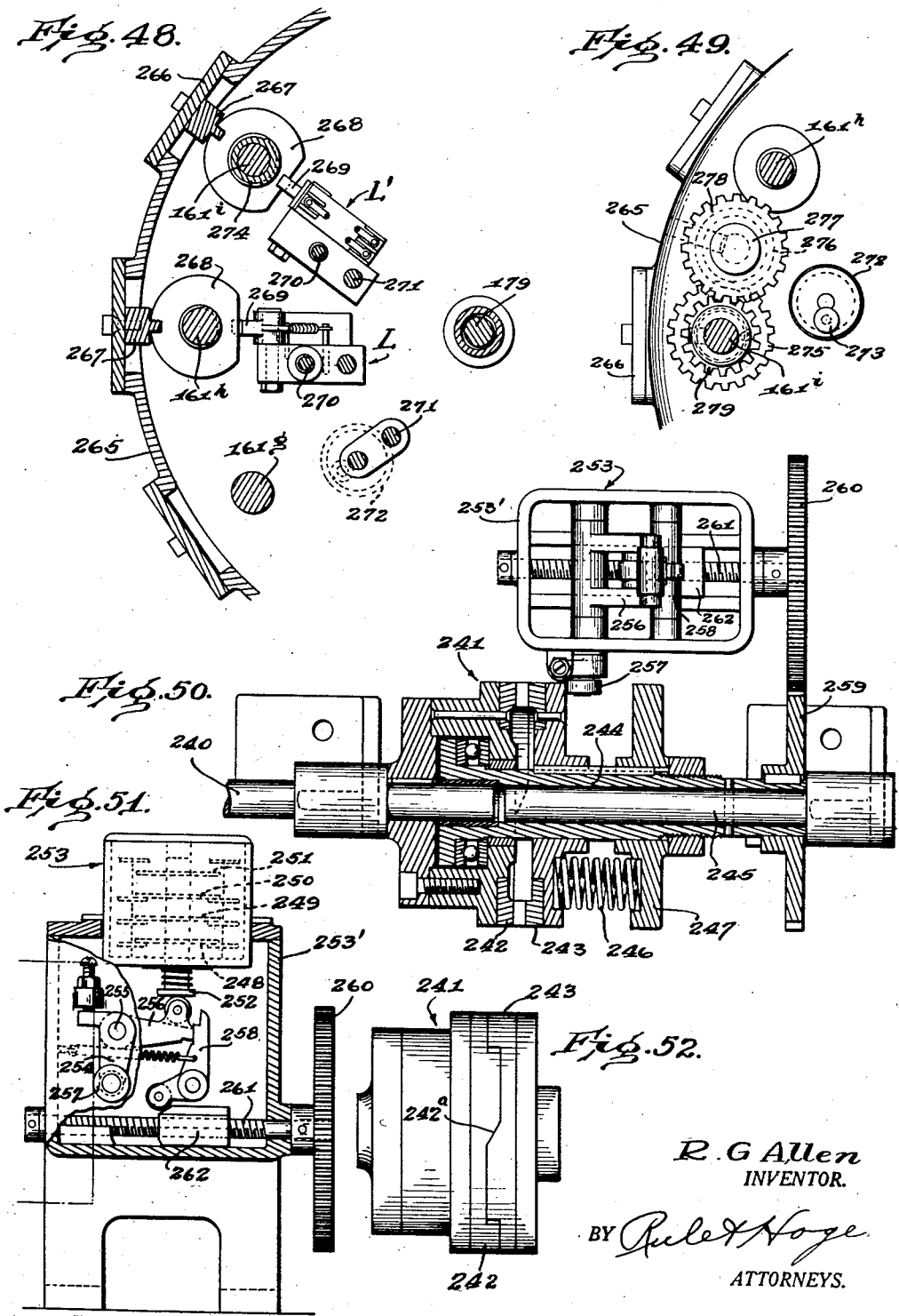

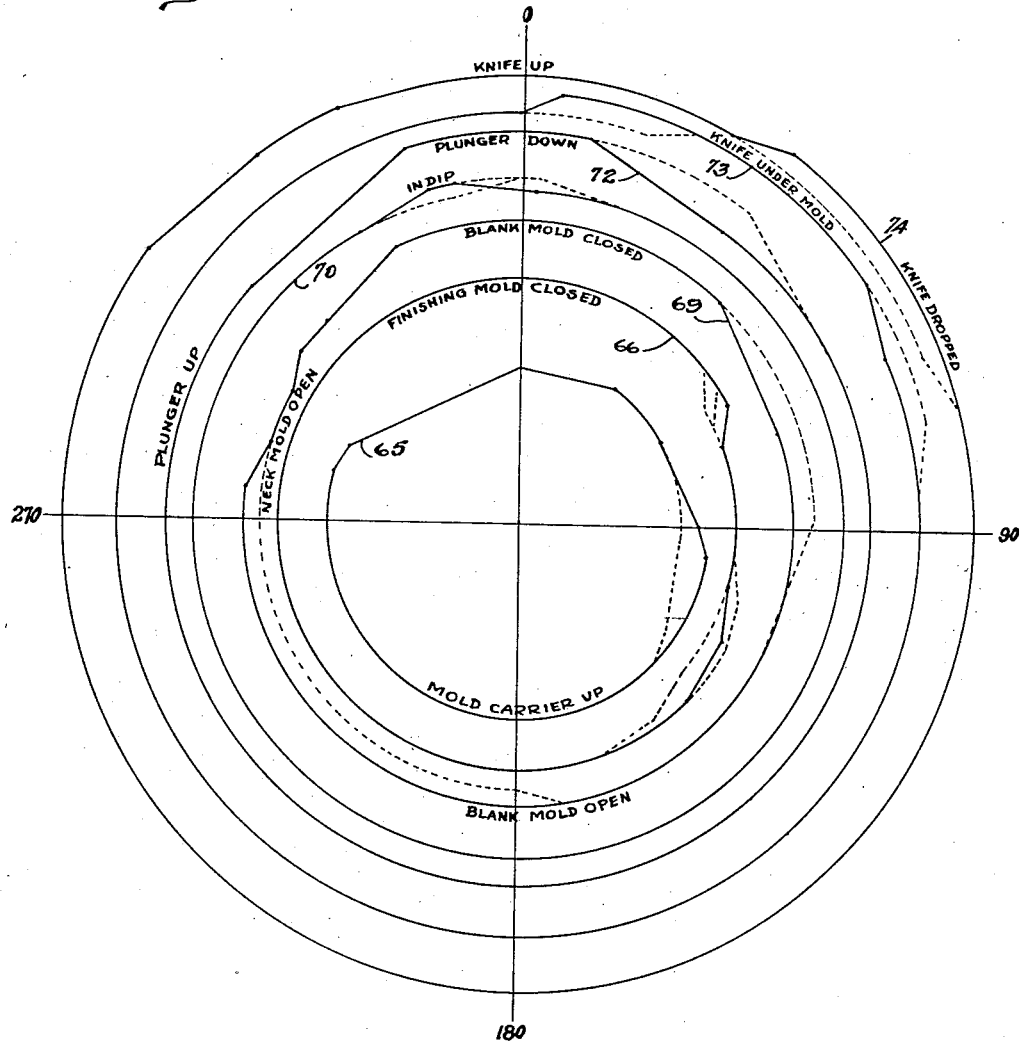

Jan. 6, 1942.  R. G. ALLEN  2,269,391
MACHINE FOR MOLDING GLASS ARTICLES
Filed April 7, 1939  18 Sheets-Sheet 17
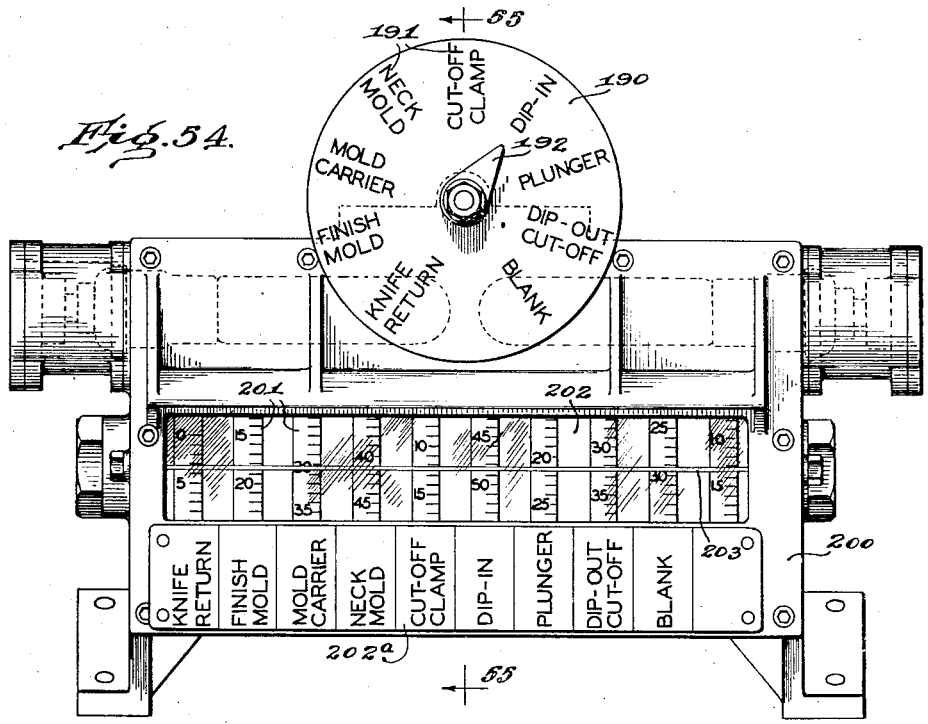
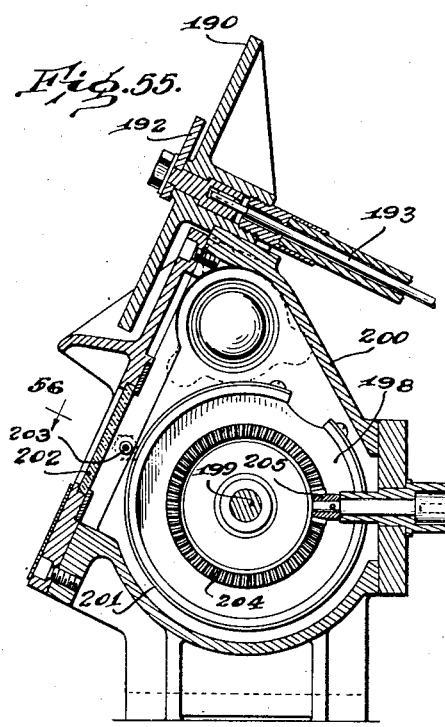
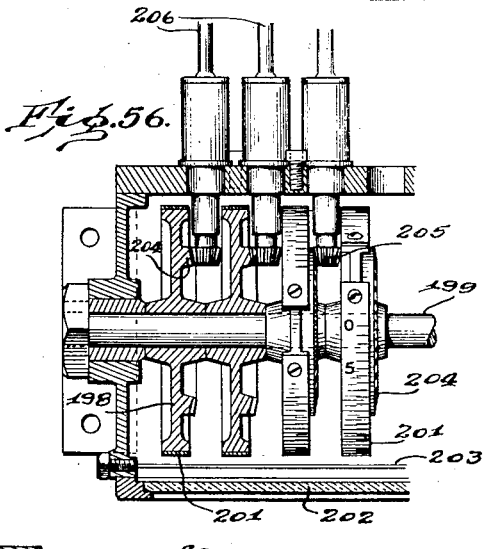
R. G. Allen
INVENTOR.
BY
ATTORNEYS.

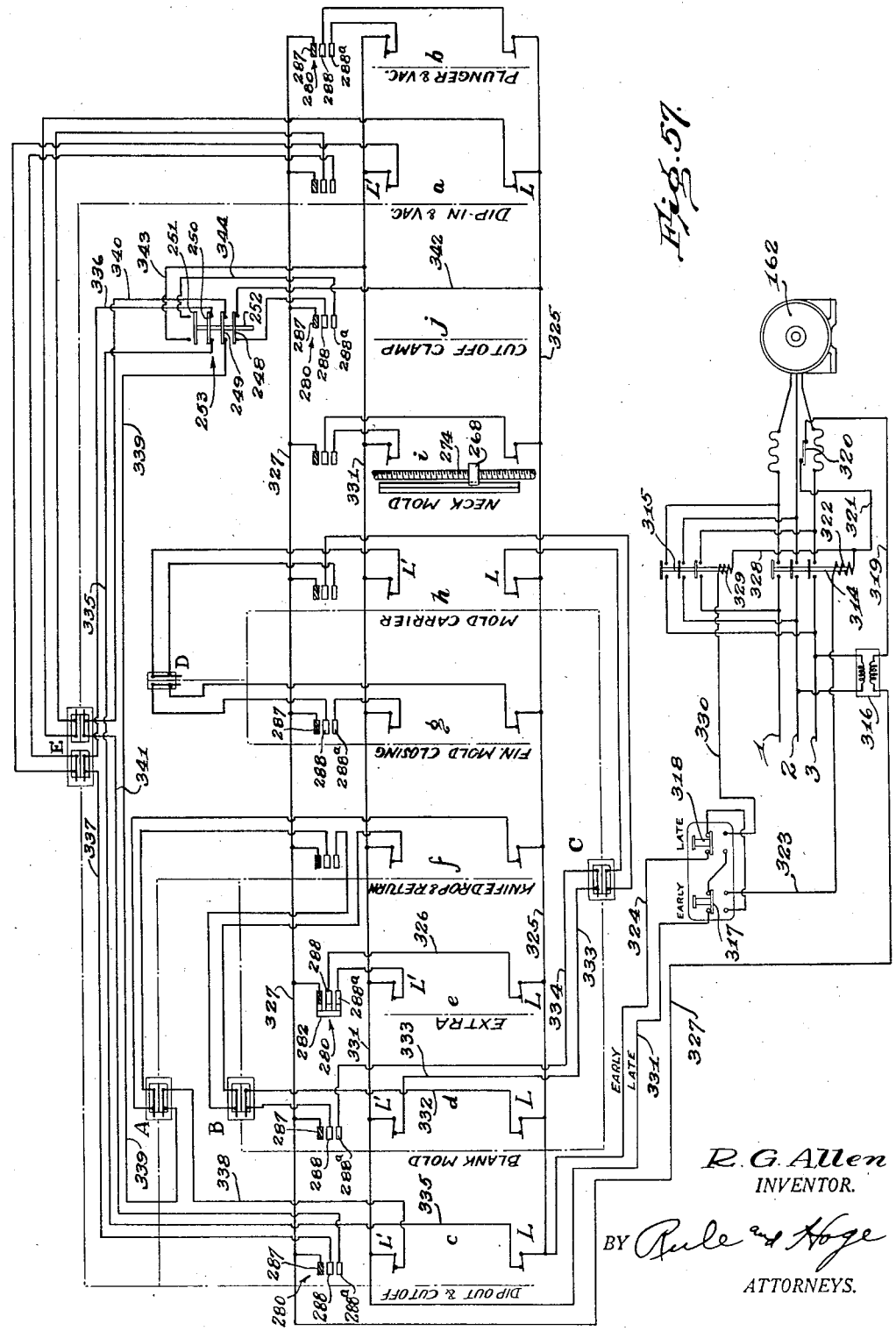

Patented Jan. 6, 1942

2,269,391

UNITED STATES PATENT OFFICE 2,269,391

MACHINE FOR MOLDING GLASS ARTICLES

Russell G. Allen, Alton, Ill., assignor to Owens-Illinois Glass Company, a corporation of Ohio Application April 7, 1939, Serial No. 266,627

30 Claims. (Cl. 49—14)

My invention relates to adjusting mechanism for adjustably regulating, timing, controlling and synchronizing the various operations or steps in the operation of automatic glass blowing machines or other mechanisms. The invention as herein illustrated is particularly adapted for use with and as forming a part of an Owens type machine for blowing hollow glass articles, in which charges of glass are introduced by suction into parison molds and thereafter the parisons are transferred to finishing molds in which they are blown to the form of finished articles.

Conventional machines of this type comprise a mold carriage rotating continuously about a vertical center column and a plurality of heads or units arranged in an annular series on the carriage. Each unit may comprise a body blank mold and a neck mold in register therewith, together forming a parison mold which is periodically brought over a pool of glass as the carriage rotates, a dip head on which the parison mold is carried, means for lowering the dip head to bring the mold into contact with the pool of glass for gathering its charge and for then lifting the dip head, a plunger which is projected into the parison mold and forms an initial blow opening in the parison, a swinging knife for severing the charge of glass when the mold is lifted, means for blowing the glass within the blank mold, and means for opening and closing the blank mold and neck mold. Associated with each blank mold is a finishing mold and its carrier, mounted on the mold carriage, and mechanism for lifting and lowering the finishing mold, for closing it about a parison, and for blowing the parison within the finishing mold.

A machine of this type is adapted for making hollow glass articles in a great variety of shapes and sizes as the molds are interchangeable, permitting the use of molds corresponding to the particular articles to be formed therein. In order to obtain ware of high quality, it is important to provide adjusting means individual to the various operating cams or other devices, for individually adjusting the time at which the various operations take place. The patent to Allen et al., 1,981,937, November 27, 1934, discloses a machine of the type above indicated comprising many such adjustment features. The present invention involves various features of novelty in the nature of improvements over what is disclosed in said patent.

In a machine of the type herein illustrated the various operations are controlled in the main by stationary cams adjustable circumferentially of the machine. An object of the present invention is to provide novel means for determining the limits of adjustment for the individual cams and adjustably varying such limits. More particularly, the invention provides adjustable means for controlling the motor by which the cams are selectively adjusted and automatically stopping the motor when the cams have been adjusted to the predetermined limits.

A further object of the invention is to provide automatic safety switches to control the limits of adjustment of various cams relative to each other in a manner to prevent interference of the mechanisms controlled thereby.

Other objects of the invention will appear hereinafter.

Referring to the accompanying drawings:

Fig. 1 is a fragmentary sectional elevation of an Owens type machine for blowing hollow glassware, constructed in accordance with the present invention;

Fig. 2 is a part sectional plan view showing the cam plate and cams controlling the swinging movements of the knife and the knife drop, and also showing a clamping mechanism for the cam which controls the knife swing;

Figs. 3, 4, 5 and 6 are sectional views taken at the correspondingly designated lines on Fig. 2;

Fig. 7 is a bottom plan view of the cam plate shown in Fig. 2, with the plunger operating cam mounted thereon;

Figs. 8, 9 and 10 are sectional views taken at the correspondingly designated lines on Fig. 2;

Fig. 11 is a plan view showing the dip cam which controls the up and down movements of the dip head;

Figs. 12 to 17 are sections at the correspondingly designated lines on Fig. 11;

Fig. 18 is a bottom plan view showing the neck mold cam which controls the opening of the neck mold;

Figs. 19 to 23 are sections at the correspondingly designated lines on Fig. 18 but in non-inverted position;

Fig. 24 is a bottom plan view of the blank mold cam plate and cam controlling the opening of the blank mold;

Figs. 25 to 28 are sections at the correspondingly designated lines on Fig. 24 but in non-inverted position;

Fig. 29 is a bottom plan view of a cam plate with the finishing mold cam for opening and closing the finishing mold mounted thereon;

Figs. 30 to 33 are sections at the correspondknife swing will always take place in proper time relation.

Figure 41:
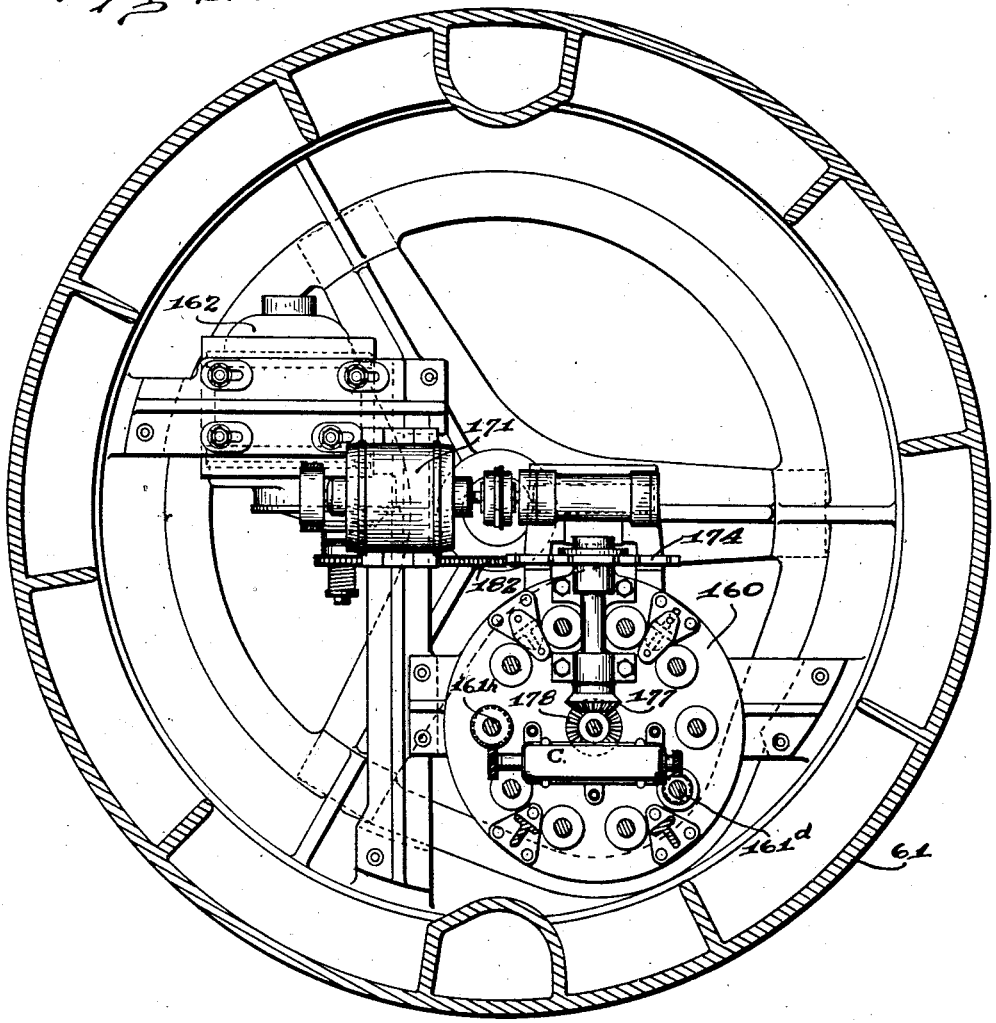

The cam 72 (Figs. 1, 7, 8) for operating the plunger is mounted on the under surface of the cam plate 71 and is adjustable by mechanism including a rack 109 attached to the cam and driven by gearing including a gear 110 and worm 111 on a shaft 112.

Referring to Fig. 11, the cam plate 78 has mounted thereon adjustable cam patches 113 and 114 controlling respectively the lowering and lifting of the dip heads. The cam patch 113 is adjusted by mechanism including a rack 115 driven by worm gearing including a worm wheel 116 and a worm 117, the latter carried on a shaft 118 driven as hereinafter described. The cam section 114 is driven in a similar manner through gearing including a rack 119, gear 120, worm 121, and shaft 122. In order to maintain the continuity of the inner wall of the cam track between the adjacent ends of the cam sections, a plate 125 (Figs. 11 and 17) is provided. Said plate has slot and pin connections with the cam sections 113 and 114, including pins 126 on the section 125, engaging slots 127 in the cam sections 113 and 114. Such connections permit a limited adjustment of either cam relatively to the other.

The blank mold opening cam 69 is mounted on the under side of the cam plate 68 as shown in Fig. 24 and is adjustable by mechanism including a rack 128 and a pinion 129, the latter driven by worm gearing including a worm 130 on a shaft 131.

The neck molds, which are in register with the body blank molds and hold the parisons while the blank molds are opened and until after the finishing molds enclose the blanks, are opened to disengage the blanks by an additional inward movement of the cam roll 83 (Fig. 1) beyond the blank mold opening position. Such movement of the cam roll for opening the neck molds is controlled by a cam section 132 (see Figs. 18 to 23) which cooperates with the blank mold opening cam substantially as set forth in detail in the above noted patent to Allen et al., 1,981,937. The mechanism for adjusting the neck cam 132 includes a sprocket chain 133 which at its opposite ends is connected to the ends of the cam 132, the sprocket chain being trained over a driving sprocket 134 and an idler sprocket wheel 135, the chain intermediate the sprocket wheels being supported and guided by arc-shaped walls or flanges formed on the cam plate 68 and extending circumferentially of the machine. In order to fill in the gap in the outer cam wall section as the cam section 132 is adjustably moved to the left, a cam wall extension chain 136 is attached to the cam and guided into position to fill in the gap. A take-up device (Figs. 18 and 23) is provided for taking up slack in the sprocket chain 133 and adjusting the tension thereon. Said device includes an adjusting rod 137 connected to a bearing block 138 in which the shaft for the sprocket gear 135 is journalled, said bearing block mounted in guideways permitting such adjustment. The rod 137 is screw-threaded to receive adjusting nuts which engage a bearing lug 139 through which the rod extends. Means for driving the sprocket chain 133 includes a shaft 140 (Fig. 18) having a driving connection, through a worm 141 and worm wheel 142, with the driving sprocket 134.

The cams controlling the opening and closing movements of each finishing mold (see Fig. 29) are aligned with a cam track 67 extending in an arc concentric with the mold carriage. They include an adjustable cam section or patch 143 for opening the finishing mold, and an adjustable cam section 144 for closing the finishing mold. The section 143 is held in adjusted position by screw bolts 145 (Figs. 29 and 30). For adjusting the cam section 144, power mechanism is provided operating through a train and gearing including a shaft 146, a worm 147, a worm gear 148, a pinion 149 on the worm gear shaft, and a gear 150 which drives a rack 151 attached to the cam 144.

Referring to Figs. 34 to 39, the cam for lifting the finishing mold carrier includes the cam patch 65 adjustably mounted on the cam plate 64. The motor for adjusting the cam operates through a train of gearing including a shaft 153, worm 154, and worm wheel 155, the latter mounted on a shaft 156 (Fig. 38) carrying a pinion 157 which engages a rack 158 on the cam section.

The mechanism for selectively adjusting the various cams will now be described. Such mechanism, illustrated in Figs. 40 to 47 inclusive, comprises an annular series of adjusting units mounted in part in the gear case 160. Each said unit includes a driving spindle (designated 161 with exponents $a$ to $j$ added to designate the individual spindles) each spindle having driving connections with a corresponding cam or cams as pointed out hereinafter. Selecting mechanism is provided by which any selected one of said units may be connected through power transmission mechanism to a cam adjusting electric motor 162 for driving the selected unit.

Each of the driving units includes an adjusting gear 163 (Figs. 42, 43) journalled on the spindle 161, and a sleeve 164 having a fixed mounting in the gear case. A clutch member 165 splined on the shaft 161 for up and down movement, when lowered provides a driving connection between the gear 163 and the shaft. When the clutch member is moved upward it releases the gear 163 and locks with the sleeve 164, thereby holding the spindle against rotation.

Means for selectively operating the clutch members includes a selector cam 167 formed with a cam track 168 to receive cam rolls carried on bell cranks 169. One arm of each bell crank is connected to a clutch member 165 for moving the latter up and down. The two arms of the bell crank are mounted for relative rotation with an interposed spring 170 providing a yielding connection therebetween. The selector cam is so designed that as it rotates, the bell cranks 169 are operated in succession and thereby connect the driving spindles 161 singly and in succession with their driving pinions 163.

The selector cam 167 is driven by an electric motor 171 (Figs. 41, 42) which operates through speed reduction gearing including a worm 172 on the motor shaft and a worm gear 173, to drive a Geneva gear 174. The driving member 175 for the Geneva gear may be mounted on the shaft of the worm gear 173. The gear 174 is mounted on a shaft 176 operating through beveled gears 177 and 178 to drive a shaft 179 on which the selector cam 167 is mounted. When the electric motor 171 is running, it operates through the gearing just described to impart intermittent step by step movement to the selector cam, each step movement operating one of the clutches so that the driving spindles 161 are connected singly and in succession to their respective driving gears 163.

Mechanism for transmitting motion from the motor 162 to the spindles 161 includes a shaft 180 on which is mounted a sprocket wheel 181 driven by a sprocket chain 182 (Figs. 41 and 42) which in turn is driven by the motor 162 operating through suitable speed reduction gearing. A bevel pinion 183 on the shaft 180 drives a gear 184 on a shaft 185 journalled in the lower wall of the gear case. A sun gear 186 keyed to the shaft 185 meshes with an annular series of transmission gears 187 (see Fig. 43), each of said gears 187 meshing with two of the driving gears 163. It will be seen that with this arrangement the motor 162 operates to drive all of the gears 163 simultaneously, but only one of the driving spindles is connected at any time to its driving gear 163.

Indicator mechanism (Figs. 54 to 56) is provided for use with the cam selecting mechanism and also to indicate the position to which the various cams have been adjusted. Such mechanism includes a dial 190 having printed on its face legends 191 or other indicating means cooperating with a pointer 192 for indicating which cam is operatively connected with the motor 162. The pointer is carried on a flexible shaft 193 (Figs. 55, 40 and 47). The shaft 193 has driving connection through bevel gears 194 and 195 with the shaft 179 on which the selector cam 167 (Fig. 42) is mounted. When the selector motor 171 is started, as by depressing a push button in the control circuit of the motor, the pointer 192 is rotated, and when it indicates the selected cam, the push button is released, leaving the selected cam operatively connected with the cam adjusting motor 162. The motor 171 has a brake that stops rotation when the current is off.

The means for indicating the position to which each cam is adjusted, includes a series of disks 198 (Figs. 55 and 56) mounted for rotative adjustment on a shaft 199 supported in the indicator frame 200. Each disk 198 has mounted on its periphery a band 201 with scale markings or other indicia. A window 202 in the front wall of the indicator frame exposes the scale markings to view. A name plate 202ª extending along the window is provided with names opposite the bands 201 to designate the corresponding cams. A rod 203 positioned in front of the scales provides a base line to accurately indicate the rotative position of the disks 198. Each of the indicator wheels or disks is formed with an annular gear 204 engaged by a pinion 205 on a flexible shaft 206 (Figs. 56 and 40). The shafts 206 are connected to the lower ends of the driving spindles 161.

The driving spindles 161 (individually designated by adding exponents $a$ to $j$, Fig. 45) have driving connections with the corresponding cams as will now be described. Referring to Fig. 11 the spindle 161ª for adjusting the dip cam 113, carries a pinion 207 at its upper end which meshes with a pinion 208 on a horizontal shaft 209, the latter having driving connections through bevel gears 210 and 211 with a shaft 212 coupled to the shaft 116 which has, as heretofore described, a driving connection with the cam 113. The driving spindle 161ᶜ for adjusting the cam 114, carries at its upper end a driving pinion 213 which drives a gear 214 on a shaft 215 coupled to the shaft 122.

Referring to Figs. 2 and 7, the driving connections for the plunger operating cam 72 include a bevel gear 216 on the shaft 161ᵇ, which drives a pinion 217 on a horizontal shaft 218 coupled to the shaft 112.

The cut-off cam 73 is also driven from the spindle 161ᵇ. The gearing for driving the cut-off cam includes a shaft 219 (Figs. 2 and 40) driven from the spindle 161ᵇ, bevel gear 220 on the shaft 219, driving a bevel gear 221 on a vertical shaft 222. A bevel gear 223 on the upper end of the shaft 222 drives a gear 224 on a horizontal shaft 225 coupled to the shaft 98.

It has been found that in practice there is sometimes a tendency for the cut-off cam 73 (Fig. 2) to creep so that it does not accurately retain its adjusted position. This may be due to the fact that the cam operating section 73ª of the track is rather steep so that each cam roll as it advances will strike said section with something of a jarring or hammer blow. In order to overcome this difficulty the present invention provides a clamping device for clamping the cam in its adjusted position and electrically operated and controlled means for actuating the clamping device.

Referring to Figs. 2 and 9, the clamping device includes a clamping plate 230 anchored by a pin 231 to the cam plate 71. The free end of the clamping plate engages a groove extending lengthwise in the rack bar. A worm wheel 232 is fixed to a stud shaft 233 which has a screw-threaded connection with the clamping plate so that when the worm wheel is rotated the plate is drawn down into clamping engagement with the rack bar. The worm wheel 232 is driven by a worm 232ª on a shaft 234. The latter is driven from the spindle 161ʲ through a train of gearing including a bevel gear 235 (Figs. 2 and 40) on the spindle and running in mesh with a gear 236 on one end of a horizontal shaft 237, the latter having driving connections through bevel pinions 238 and 239 with a shaft 240. The latter has driving connections through a clutch mechanism 241 with the shaft 234.

The clutch mechanism (Figs. 2, 50 and 52) includes a driving clutch member 242 and a driven member 243. The clutch member 242 has a fixed connection with the shaft 240. The driven clutch member 243 is splined on a sleeve 244, the latter keyed to a driven shaft 245 in alignment with the shaft 240. Coil springs 246 held under compression between the clutch member 243 and a disk 247 on the sleeve 244, hold the clutch member 243 with a yielding pressure against the member 242. The shaft 245 is coupled to the shaft 234 which, as before pointed out, has a driving connection with the rack bar 92 for adjusting the cut-off cam 73.

Associated with the clutch mechanism 241 is an electric control device actuated by the clutch and included in control circuits of the motor 162. The purpose of such electrical control means is to insure the release of the clamp for the cut-off cam 73 before operation of the spindle 161ᵇ which adjusts the cam. Such control mechanism (Figs. 50 and 51) includes a multiple switch 253 comprising contact bars or plates 248, 249, 250 and 251, carried on a stem 252 mounted for up and down movement in a switch box 253'. When the stem 252 is in its lowered position the bars 248, 249 and 250 bridge pairs of stationary contacts within said casing. When the switch is moved upward, the upper contact bar 251 bridges another pair of contacts.

The operation of the clamp for the cut-off cam is as follows: When the spindle 161ʲ has been selected and operatively connected to the motor 162 in the manner hereinbefore described, the motor 162 is operated and through the train of gears including the clutch 241, operates the clamping plate 230 to grip the rack 92 and hold the cam in its adjusted position. As the cam plate is drawn down into gripping position, it offers an increased resistance to the rotation of the driving means. This resistance applied through the shaft 245 (Fig. 50) causes slippage between the clutch members 243 and 242. In other words, the driven member 243 is arrested in its rotative movement and is cammed outwardly by the continued rotation of the driving element 242, permitted by the inclined surfaces 242ª (Fig. 52) of the clutch members. In this manner the driving connection is broken automatically when the clamp has been set.

The separation of the clutch members at the same time serves to operate the switch (Fig. 51) through mechanism including a rock arm 254 fixed to a rock shaft 255 journalled in the switch casing 253'. A second arm 256 on the rock shaft carries a roll which engages the stem 252. When the clutch member 243 is cammed outwardly as above described, it presses a roll 257 on the arm 254 and operates the switch. When the switch is thus operated a latch 258 engages beneath the arm 256 and holds the switch.

When it is desired to release the clamp to permit adjustment of the cut-off cam, the motor 162, while operatively connected to the train of gearing leading to the clamping device, is operated in the reverse direction from that for applying the clamp. This permits reengagement of the clutch members 242, 243 so that the shaft 245 is positively driven in a direction to release the clamp. This rotation of the shaft 245 operates through a pair of gears 259, 260 to rotate a screw-threaded shaft 261 to which the gear 260 is keyed. A nut or latch operating member 262 threaded on the shaft 261 is advanced along the shaft by the rotation of the latter as the clamp is released, and thereby engages the latch 258 and releases the arm 256, thus permitting a reversal of the switch 253. This operates as hereinafter described to open the circuit of the motor 162 and at the same time makes connections in the control circuits which, as presently set forth, permit the motor 162 to be operated for adjusting the cut-off cam.

Referring to Figs. 47, 48 and 57, each of the cam driving spindles 161 has associated therewith limit switches L and L' which limit the extent to which the cams can be adjusted in either direction. The limit switches are mounted in a casing 265 comprising removable face plates 266 individual to the spindles, each said plate having mounted thereon a guide bar 267. The spindles are screw-threaded each to receive a nut 268 formed with a slot to engage a rib on the guide bar 267 so that as the spindle rotates the nut is caused to travel up or down. Each of the limit switches comprises a finger 269 projecting into the path of the nut 268 and adapted to be operated thereby for actuating the switch and opening a control circuit of the motor 162 as hereinafter described.

Each lower limit switch L has a stationary mounting on a vertical adjusting rod 270 journalled in the end walls of the casing. The rod comprises a screw-threaded portion above the lower limit switch and having a threaded connection with the upper limit switch L' so that rotation of the rod serves to adjust the upper switch up or down. Rotation of the limit switches with the rod 270 is prevented by a guide rod 271. The rod 270 may be rotated by hand, being provided for this purpose with a knurled head 272 keyed to the rod. A button 273 on the head 272, carries a detent for engaging a recess in the casing for holding the rod against accidental rotation. The above described construction permits the upper limit switch to be adjusted up and down for adjustably determining the limiting point to which the corresponding cam may be adjusted by the motor 162.

As shown in Figs. 47 and 49, a train of speed reduction gearing is interposed between the spindle 161¹ and the traveling nut 268 which actuates the limit switches. Said gearing includes a sleeve 274 mounted on the spindle for rotation relative thereto, said sleeve being screw-threaded for driving the nut 268. Keyed to the lower end of the sleeve 274 is a gear 275 which runs in mesh with a gear 276 mounted on a stud shaft 277 on which is also mounted a gear wheel 278 running in mesh with a gear pinion 279 keyed to the spindle. It will be seen that when the spindle 161¹ is rotated, motion is transmitted through the train of gears just described for rotating the sleeve 274 at a reduced speed. It will be noted by reference to Fig. 23 that the neck mold opening cam 132 has a comparatively long range of adjustment. The speed reducing gearing just described permits such adjustment while the nut 268 on the sleeve 274 is traveling the allotted distance between the limit switches.

The selective mechanism by which the spindles are selectively brought into operative connection with the motor 162, has associated therewith a selector switch or contact mechanism for selectively connecting the corresponding limit switches in the control circuit of the motor. Such selector switch 280 (Fig. 47) comprises a radial arm 280' keyed to the upper end of the shaft 179. Said arm carries a block 281 of insulating material on which is mounted a contact bridging plate 282. Contact bars 283, 283ª and 283ᵇ are mounted in the insulating block 281 for movement radially toward and from the shaft 179. Coil springs 284, held under compression between the plate 282 and said contact bars provide electrical connection between said plate and bars. A series of insulating disks 285 are mounted on an insulating plate 286 forming a cover plate for the casing 265. A contact plate or disk 287 surmounts the disks 285. The uppermost of the bars 283 is in continuous electrical contact with the disk. The middle and lower contact bars 283ª and 283ᵇ are adapted to engage respectively, annular series of contact buttons 288 and 288ª (Figs. 45, 47 and 57). That is, said bars 283ª and 283ᵇ as they rotate with the shaft 179 respectively engage in succession the contact buttons 288 and 288ª which are individual to the cam driving spindles 161.

In addition to the limit switch mechanism (Fig. 47) for controlling the absolute limits of adjustment for the cams, it is also desirable in a machine of the character herein disclosed to provide automatic switch mechanism to limit the relative adjustments of certain of the cams in order to prevent interference of the mechanisms operated thereby and to insure a proper relative timing of the various operations. For this purpose there are provided safety switch mechanisms (Figs. 45, 46, 57) designated A, B, C, D and E.

The switch mechanism E, as shown in Figs. 45 and 46, comprises a casing 290 in which are journalled two aligned shafts 291 and 292. The shaft 292 is driven from the spindle 161ª through a train of gears including a gear 293 on the spindle driving a gear 294 on a stud shaft 295 to which is also secured a gear 296 running in mesh with a gear 297 keyed to the shaft 292. The spindle 161c is in like manner geared to the shaft 291 through a train of gearing comprising gear wheels 298, 299, 300 and 301. Switches 302, 303, 304 and 305 are mounted on a carrying frame 306 which is slidable lengthwise within the casing 290. A lug 307 (Fig. 46) on the frame 306 has a screw-threaded connection with the rod 292 so that rotation of the latter moves the switches lengthwise within the casing. A switch operating bar or member 308 carries a lug 309 threaded on the shaft 291 so that rotation of the latter causes the bar 308 to move lengthwise within the casing. The bar 308 is arranged to operate the switches. When moved to the right (Fig. 46) relative to the switch carrying frame 306, it operates to open the switches 304 and 305. Relative movement of the parts 306 and 308 in the reverse direction brings the bar 308 in contact with and opens the switches 302 and 303. The switches 302 to 305 are in the control circuits for the motor 162 as shown in the wiring diagram (Fig. 57) and operate as hereinafter set forth.

The construction of each of the safety switches A, B, C and D may be substantially identical with that of the switch mechanism E except that, as shown in the wiring diagram (Fig. 57), only two switches instead of four are required in each switch mechanism. The switch mechanism A has its driving shafts 291 and 292 geared respectively to the spindles 161f and 161c. The safety switch mechanism B has its driving shafts geared in like manner to the spindles 161f and 161d. The safety switch mechanism C (Figs. 41 and 45) has operating connections with the spindles 161d and 161h. The switch mechanism D is actuated from the spindles 161g and 161h. The spindle 161g carries a gear pinion 310 which drives a gear 311 on the shaft 291 of the switch mechanism. The spindle 161h has driving connections with the other shaft of the switch mechanism through gears 312 and 313.

The operation and control of the motor 162 for adjusting the various cams will be understood by reference to the wiring diagram (Fig. 57) which will now be described. As indicated, the motor is driven by a three-phase alternating current supplied from the mains 1, 2 and 3. Main line switches 314 and 315 are electrically operated by current supplied to the control circuit from the secondary winding of a transformer 316. Push button switches 317 and 318 are operable to start the motor in either direction. The stations to which the contact plate 282 of the selector switch 280 (Fig. 47) is brought during its rotation are designated on the wiring diagram by the letters $a$ to $j$ inclusive, corresponding to the spindles 161a to 161j inclusive. The contact plate 282 is at station $e$ and bridges or electrically connects the contact disk 281 with contacts 288 and 288a at said station. The spindle 161e at station $e$ is an extra spindle in the particular construction shown and may operate idly when driven by the motor 162.

If the push button 317, for example, is depressed, a circuit is established through the secondary winding of transformer 316 for closing the main switch 314, which circuit may be traced as follows: from the transformer through conductor 319, thermo-overload relay 320, conductor 321, switch magnet coil 322, conductor 323, switches 317 and 318, conductor 324, conductor 325, lower limit switch L at station $e$, conductor 326, contacts 288, 282, 287, and return wire 327 to the transformer. The main switch 314 is thus closed so that the motor 162 is started and drives the spindle 161e. The motor will continue to run until the push button switch is released or until the limit switch L is automatically opened as heretofore described, cutting off the current through the main switch magnet 322 and opening the switch 314. If it is desired to run the motor in the reverse direction the switch 318 is depressed. The control circuit from the transformer 316 is then by way of conductors 319, 321, 328, magnet coil 329 of the main switch 315, conductor 330, switches 318, 317, conductor 331, through upper limit switch L' at station $e$, and thence through the selector 280 and return wire 327. The main switch 315 is thus closed and the motor 162 operated in the reverse direction.

It will be noted that the lower limit switches L are all connected to the conductor 325 which is connected in the control circuit when the push button 317 is depressed. The upper limit switches L' are in like manner all connected to the conductor 331 which is in the control circuit established by depressing the switch button 318. The contact plate 282 of the selector switch as heretofore described, is moved to any selected station by operating the selecting mechanism so that the control circuit established by operating the push buttons 317 or 318 is established through the corresponding station.

If it is desired, for example, to adjust the cam for opening the blank mold so as to advance the time of opening, the selector mechanism is operated as heretofore described to connect the spindle 161d with the motor 162. The push button 317 is then operated to establish a control circuit which may be traced as before to the conductor 325 and thence through limit switch L at station $d$, conductor 332, safety switch B and selector switch 280 to return wire 327. If, on the other hand, it is desired to adjust the blank mold opening cam in the reverse direction to retard the opening of the mold, the push button 318 is operated so that the control circuit is established by way of conductor 331 and upper limit switch L' at station $d$, thence through conductor 333, safety switch C and conductor 334 to the return line 327. The control circuit may in like manner be traced through any of the several stations $a$ to $j$ when the corresponding driving spindle has been selectively placed in driving connection with the motor.

In regard to the adjustment of the cam controlling the lifting of the mold out of dip and the cut-off, such adjustment can only be made while the cut-off clamp (station $j$) is released. The control switch 253 is shown in the wiring diagram (Fig. 57) in the position assumed while the clamp is released so that a control circuit may be established through either of the limit switches L and L' at the station $c$ for causing the motor 162 to adjust the cut-off cam in either direction. For example, if an adjustment of the cam for an earlier cut-off is desired, the push button 317 is depressed. The control circuit may now be traced as before from the transformer 316 to the switch L at station $c$, thence through conductor 335 to the clamp control switch 253, through contact plate 250, conductor 336, safety switch E, conductor 337, selector switch 280 at station $c$ and return wire 327. The motor 162 will now operate to adjust the cut-off cam to any desired position. If the cam is to be adjusted in the reverse direction the push button 318 is operated to establish a control circuit through limit switch L' at station c, which circuit can be traced from the limit switch through conductor 338, safety switch A, conductor 339, contact bar 249 of the switch 253, conductor 340, safety switch E, and conductor 341, selector switch 280 at station c, and return wire 327.

After adjustment of the cut-off cam, the cut-off clamp may be operated. For this purpose the push button 318 is depressed, establishing a control circuit extending through the conductor 325, wire 342, switch bar 248, selector switch 280 at station j, and return wire 327. The motor 162 then operates to set the clamp as heretofore described, which results in separating the clutch members 242, 243 (Figs. 50 and 51), and at the same time lifting the stem 252 of the switch 253, thereby breaking the circuits through the switch bars 248, 249 and 250. The control circuit for the motor 162 is thus broken at the switch bar 248 and the motor is stopped. Also, the switch bars 249 and 250 being lifted prevent a control circuit being established through station c for adjusting the cut-off cam, until the clamp has been released. The reversal of the switch 253 just described also causes the switch bar 251 to bridge conductors 343 and 344, which permits a control circuit to be established for operating the motor in a direction to release the clamp.

Modifications may be resorted to within the spirit and scope of my invention.

I claim:

1. A machine comprising in combination, a rotating carriage, a plurality of stationary cams, devices on the carriage actuated by said cams when said devices reach predetermined positions during the rotation of the carriage, adjusting units individual to said cams and operatively connected thereto for selectively adjusting the cams, a cam adjusting motor, power transmission mechanism driven by the motor, a selector device, a selector motor connected to operate said selector device, and means operated by said selector device to connect said adjusting units singly and in succession to said power transmission mechanism.

2. A machine comprising in combination, a rotating carriage, a plurality of stationary cams, devices on the carriage actuated by said cams when said devices reach predetermined positions during the rotation of the carriage, adjusting units individual to said cams and operatively connected thereto for selectively adjusting the cams, a cam adjusting motor, power transmission mechanism driven by the motor, a selector device, a selector motor connected to operate said selector device, means operated by said selector device to connect said adjusting units singly and in succession to said power transmission mechanism, and indicating means to indicate which adjusting unit has operating connection with its driving motor.

3. A machine comprising in combination, a rotating carriage, a plurality of stationary cams, devices on the carriage actuated by said cams when said devices reach predetermined positions during the rotation of the carriage, adjusting units individual to said cams and operatively connected thereto for selectively adjusting the cams, a cam adjusting motor, power transmission mechanism driven by the motor, a selector device, a selector motor connected to operate said selector device, means operated by said selector device to connect said adjusting units singly and in succession to said power transmission mechanism, indicating means actuated by the selector motor to indicate which adjusting unit has operating connection with its driving motor, and indicating means actuated by said cam adjusting motor to indicate the extent to which a selected cam has been adjusted.

4. The combination of a rotating carriage, mechanism thereon to be operated, a plurality of cams individually controlling separate operations of said mechanism, said cams being adjustable to adjustably vary the time at which the respective operations of said mechanism are effected during the rotation of the mold carriage, adjusting units individual to said cams and operatively connected thereto for effecting said adjustments, motor, power transmission mechanism driven by said motor, a selector operable to connect said adjusting units singly and in succession with said transmission mechanism, and a selector motor for operating said selector.

5. The combination of a rotating carriage, mechanism thereon to be operated, a plurality of cams individually controlling separate operations of said mechanism, said cams being adjustable to adjustably vary the time at which the respective operations of said mechanism are effected during the rotation of the mold carriage, adjusting units individual to said cams and operatively connected thereto for effecting said adjustments, a motor, power transmission mechanism driven by said motor, a selector operable to connect said adjusting units singly and in succession with said transmission mechanism, a selector motor for operating said selector, power transmitting mechanism between said selector motor and the selector, including means for effecting a step by step movement of the selector when its motor is in operation, said step movements of the selector effecting a driving connection of the said adjusting units to their driving motor in succession, and indicating means indicating when a selected adjusting unit is operatively connected to its driving motor and indicating the position to which the corresponding cam is adjusted.

6. The combination of a plurality of cams, cam adjusting mechanisms individual to the cams, means for driving said mechanisms, a selector device, a power motor for operating the selector device, power transmitting means between said motor and the selector device for operating the latter intermittently step by step while the motor is running, and means actuated by the selector device to effect an operative driving connection between the cams and their said adjusting mechanisms singly and in succession.

7. The combination of a plurality of cams, adjusting mechanisms individual to the cams, a selector device, means operated thereby for effecting driving connections between the cams and their said adjusting mechanisms, an electric motor, and driving means between the motor and selector device by which continuous movement of the motor imparts an intermittent step by step movement to the selector device.

8. The combination of a plurality of cams, adjusting mechanisms individual to the cams, a selector device, means operated thereby for effecting driving connections between the cams and their said adjusting mechanisms, an electric motor, and driving mechanism between the motor and selector device, including a Geneva drive by which continuous rotation of the motor imparts a step by step rotation to the selector device.

9. The combination of a plurality of cams, driving spindles individual to the cams, said spindles arranged in an annular series, motion transmitting means between the spindles and their respective cams, spindle driving means, clutches individual to said spindles, a selector cam rotatable step by step, means operated by the selector cam to actuate said clutches and thereby effect driving connections between said spindle driving means and the spindles, an electric motor, and driving means between said motor and the selector cam including a Geneva drive for imparting said step by step rotation to the selector cam.

10. The combination of a cam, means for adjusting it, a clamp operable to clamp the cam and hold it in its adjusted position, a power motor, driving connections between the motor and said clamp for actuating the latter and applying it to the cam, and automatic means to break said connections when said clamp has been applied.

11. The combination of a cam, means for adjusting it, a clamp operable to clamp the cam and hold it in its adjusted position, a power motor, driving connections between the motor and said clamp for actuating the latter and applying it to the cam, said driving connections including a clutch, and automatic means for releasing the clutch.

12. The combination of a cam, means for adjusting it, a clamp operable to clamp the cam and hold it in its adjusted position, a power motor, driving connections between the motor and said clamp for actuating the latter and applying it to the cam, said driving connections including a clutch comprising a driving member and a driven member, and means whereby the resistance offered to movement of the driven member when the clamp has been brought to clamping position, operates to disengage the clutch members and break the driving connection between the motor and the clamp.

13. The combination of a cam, means for adjusting it, a clamp operable to clamp the cam and hold it in its adjusted position, a power motor, driving connections between the motor and said clamp for actuating the latter and applying it to the cam, said driving connections including a clutch comprising a driving member and a driven member, means whereby the resistance offered to movement of the driven member when the clamp has been brought to clamping position, operates to disengage the clutch members and break the driving connection between the motor and the clamp, and a switch controlled by said clutch and operative automatically to stop the motor when said driving connection is broken.

14. The combination of an adjustable cam, a clamp to hold the cam in its adjusted position, an electric motor, driving connections between the motor and the clamp for applying the latter to the cam, means by which the resistance of the clamp to continued movement when brought to clamping position operates to break said driving connections.

15. The combination of an adjustable cam, a clamp to hold the cam in its adjusted position, an electric motor, driving connections between the motor and the clamp for applying the latter to the cam, means by which the resistance of the clamp to continued movement when brought to clamping position operates to break said driving connections, and means whereby the breaking of said driving connections operates to open the motor circuit and stop the motor.

16. The combination of an adjustable cam, an electric motor, driving connections between said motor and the cam for adjustably moving the cam, a clamp for holding the cam in its adjusted position, a clamp operating motor, driving connections between the clamp and its operating motor, a control circuit for the cam driving motor, an electric control device in said circuit, and means actuated by the clamp when the latter is applied to the cam for actuating said control device and thereby preventing operation of the cam driving motor while the clamp is applied to the cam.

17. The combination of a cam, an electric motor for adjusting the cam, driving connections between the motor and the cam, a clamp for holding the cam in its adjusted position, driving connections between the clamp and said motor for setting and releasing the cam, an electric switch mechanism controlling the circuits of said motor, and means controlled by the clamp for operating said switch mechanism.

18. The combination of an adjustable cam, a clamp to hold the cam in adjusted position, an electric motor, driving means between the motor and clamp including a clutch comprising separable elements, an electric switch in a control circuit of the motor, means by which the clamp when set causes a separation of the clutch members, and means operated by the separation of the clutch members to operate the switch.

19. The combination of an adjustable cam, a clamp to hold the cam in adjusted position, an electric motor, driving means between the motor and clamp including a clutch comprising separable elements, an electric switch in a control circuit of the motor, means by which the clamp when set causes a separation of the clutch members, means operated by the separation of the clutch members to operate the switch, a latch to hold the switch in its operated position, and means operable automatically to release the latch when the motor is run in the reverse direction.

20. The combination of an adjustable cam, an electric motor for adjusting the cam, driving means between the motor and the cam, a limit switch in a control circuit of the motor, a switch operating device interconnected with said driving means and arranged to operate said switch and stop the motor when the cam has been adjusted to a predetermined limit, and means for adjusting said switch and thereby adjustably varying the limit of adjustment for said cam.

21. The combination of an adjustable cam, an electric motor, driving connections between the motor and the cam including a rotating driving spindle, a limit switch controlling a circuit of the motor, a switch operating nut having a screw-threaded connection with the said spindle, means cooperating with said nut to cause the latter to travel along the spindle when the latter is rotating, said switch being positioned in the path of said nut and arranged to be operated thereby for stopping the motor when the nut reaches a predetermined position corresponding to a predetermined position of adjustment of the cam.

22. The combination of a plurality of cams, an electric motor, power transmitting devices individual to the cams, selective means for selectively connecting said devices to the motor, limit switches controlling the motor and individual to said devices, and means individual to said power transmitting devices for operating the limit switches.

23. In a machine of the character described, the combination of a plurality of adjustable cams, devices controlled and actuated by said cams while the machine is in operation, means for individually adjusting said cams, and automatic safety devices operable to limit the relative adjustment of the cams to prevent interference between the said devices, said safety devices including automatic means by which the limit of adjustment of one cam is variable and determined by the extent of adjustment of another said cam.

24. The combination of a rotary carriage, a plurality of stationary adjustable cams, devices on the carriage arranged to be actuated by said cams in a predetermined order of sequence and at predetermined intervals during the rotation of the carriage, an electric motor, power transmitting mechanisms between the motor and said cams for individually adjusting the cams, safety switch mechanisms including safety switches in a controlling circuit of the motor, operating connections between the safety switch mechanisms and said power transmitting mechanisms whereby the switches are operative to arrest the motor when a cam has been adjusted to a point predetermined by the adjusted position of another cam, thereby preventing interference between the devices operated by said cams.

25. The combination of a rotary carriage, a plurality of stationary adjustable cams, devices on the carriage arranged to be actuated by said cams in a predetermined order of sequence and at predetermined intervals during the rotation of the carriage, an electric motor, power transmitting mechanisms between the motor and said cams for individually adjusting the cams, safety switch mechanisms including safety switches in a controlling circuit of the motor, said safety switch mechanisms each having operating connections with a plurality of said power transmitting mechanisms and operable to stop the motor when the corresponding cams have been adjusted to a predetermined relative position.

26. The combination of adjustable cams, an electric motor, driving spindles individual to the cams and operatively connected thereto for adjusting the cams, means for connecting the motor to said driving spindles selectively, a safety switch mechanism comprising relatively movable switch elements having operating connections respectively with said driving spindles and operable when moved to a predetermined relative position to arrest the motor.

27. The combination of adjustable cams, operating mechanisms individual to said cams for adjusting them, an electric motor, selective means for selectively effecting operating connections between the motor and the cams through said mechanisms, electric switches individual to said mechanisms, and selective means automatically operable to connect each said switch in a controlling circuit of the motor when the motor is in operating connection with the corresponding cam.

28. The combination of adjustable cams, operating mechanisms individual to said cams for adjusting them, an electric motor, selective means for selectively effecting operating conditions between the motor and the cams through said mechanisms, electric switches individual to said mechanisms, selective means automatically operable to connect each said switch in a controlling circuit of the motor when the motor is in operating connection with the corresponding cam, and automatic means for actuating each switch when the corresponding cam has been adjusted by the motor to a predetermined limit and thereby stopping the motor.

29. The combination of an electric motor, a series of cams, power transmitting mechanisms individual to said cams, a selector device operable to effect driving connections between the motor and the cams selectively through said power transmitting mechanisms, limit switches individual to the cams, devices driven by the motor and interconnected with said transmission mechanisms for actuating the limit switches when the corresponding cams have been adjusted by the motor to predetermined positions, a selector switch operatively connected with said selector mechanism and operative automatically to establish a control circuit for the motor through the limit switches selectively when the corresponding cams are in driving connection with the motor.

30. The combination of an electric motor, a plurality of mechanisms, means for selectively connecting said mechanisms to the motor to be driven thereby, switches individual to said mechanisms, a selector switch operable to connect each of said individual switches in a control circuit of the motor when the corresponding said mechanism is connected to the motor.

RUSSELL G. ALLEN.

Jan. 6, 1942.   C. H. CUNO ET AL   2,269,394
ELECTRIC LIGHTER FOR CIGARS, CIGARETTES, ETC.
Filed Sept. 12, 1936
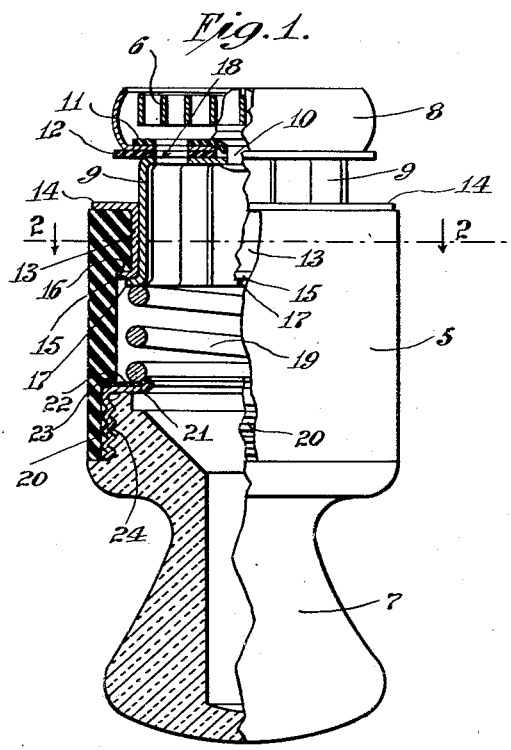
Fig.1.
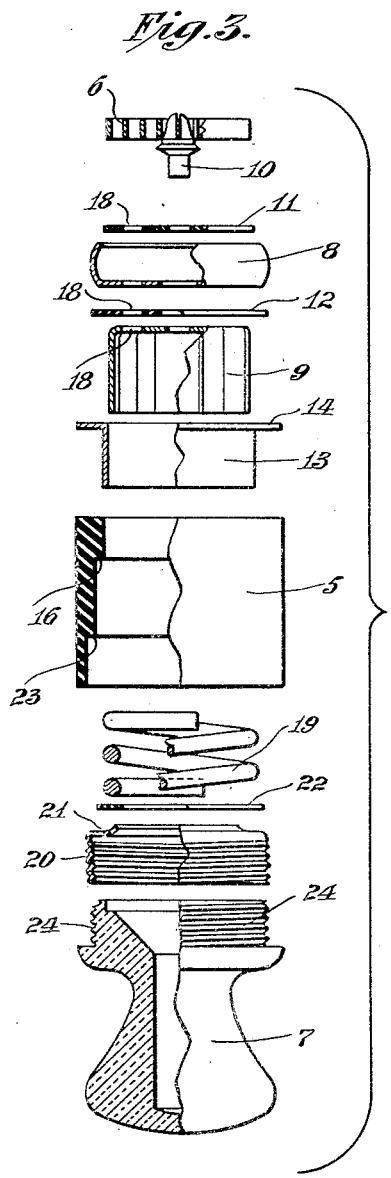
Fig.3.
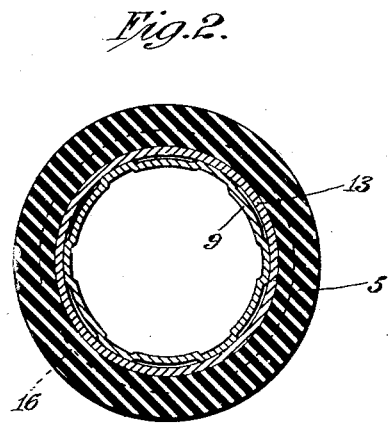
Fig.2.
Charles H. Cuno
Sidney L. Wolfson
INVENTORS
ATTORNEY